United States Patent [19]

O'Neil

[11] Patent Number: 4,860,844
[45] Date of Patent: Aug. 29, 1989

[54] POWER STEERING SYSTEM

[75] Inventor: Walter K. O'Neil, Birmingham, Mich.

[73] Assignee: Eaton Corporation, Cleveland, Ohio

[21] Appl. No.: 187,109

[22] Filed: Apr. 29, 1988

[51] Int. Cl.$^4$ .............................................. B62D 5/04
[52] U.S. Cl. .................................................. 180/79.1
[58] Field of Search ...................... 180/141, 142, 79.1, 180/161, 162; 307/10 R; 364/424; 318/615, 625, 628, 638, 652, 671, 564, 587

[56] References Cited

U.S. PATENT DOCUMENTS

| | | | |
|---|---|---|---|
| 3,011,579 | 12/1961 | Milliken | 180/142 |
| 3,247,431 | 4/1966 | Kase | 318/638 |
| 4,653,601 | 3/1987 | Nakamura | 180/142 |

FOREIGN PATENT DOCUMENTS

| | | | |
|---|---|---|---|
| 261325 | 3/1988 | European Pat. Off. | 180/142 |
| 3240629 | 5/1984 | Fed. Rep. of Germany | 180/141 |
| 67265 | 4/1985 | Japan | 180/142 |
| 12461 | 1/1987 | Japan | 180/142 |

Primary Examiner—Mitchell J. Hill
Attorney, Agent, or Firm—C. H. Grace

[57] ABSTRACT

A power steering system suitable for large off-highway and other vehicles has no mechanical linkages or hydraulic connections entering into the driver's cab. Torque demand signals are produced in an electromechanical torque sensor that measures the deflections of a torsional spring. The system provides synchronization between steering and steered wheels upon starting, without initial corrective motion of either member. During operation, the direction of the steered wheels does not drift with respect to the position of the steering wheel. In the event of certain types of failures of its primary steering system the apparatus automatically changes over to an open-loop secondary steering system that is controllable by the same steering wheel, and that has components in common with the closed-loop primary system.

10 Claims, 3 Drawing Sheets

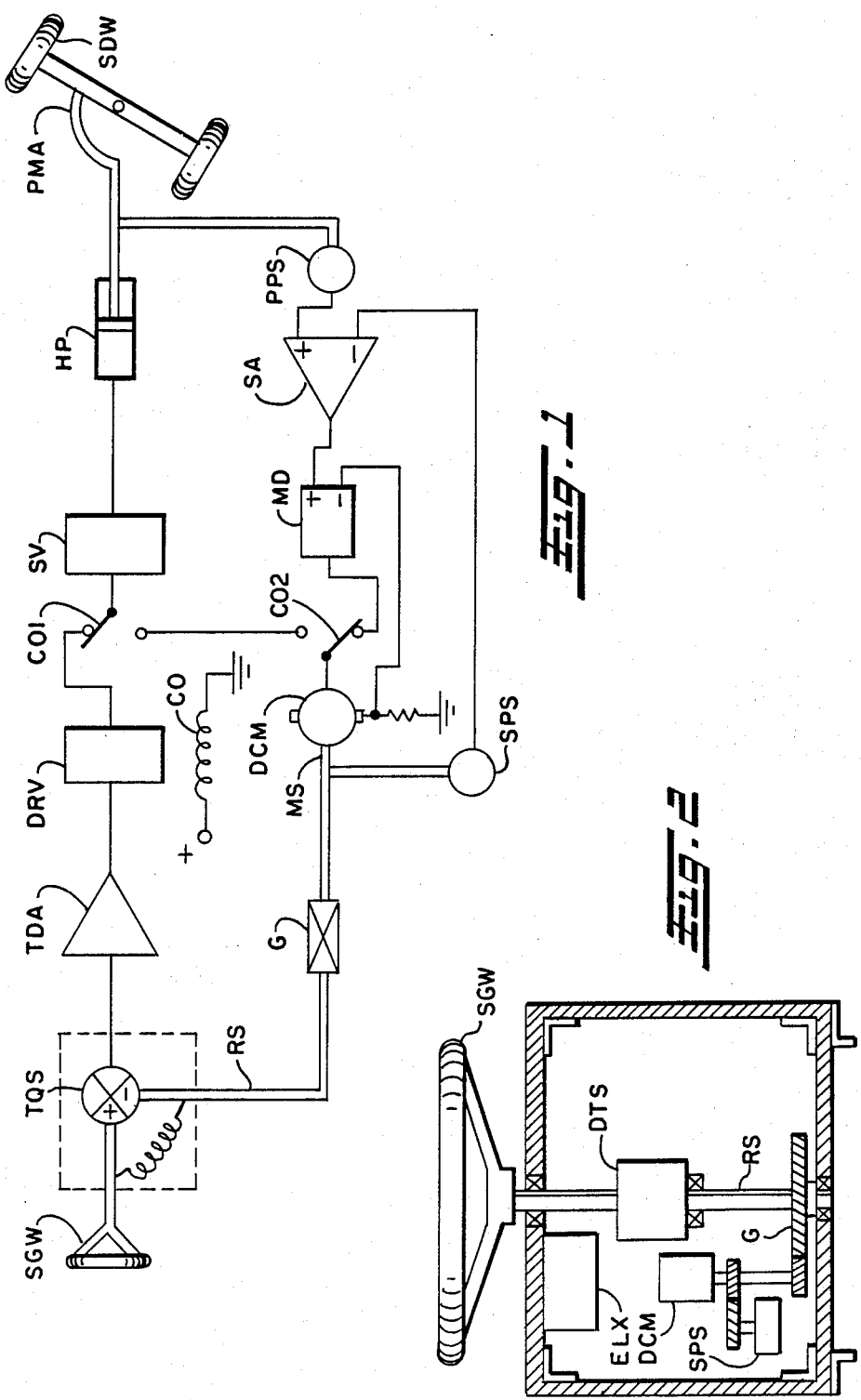

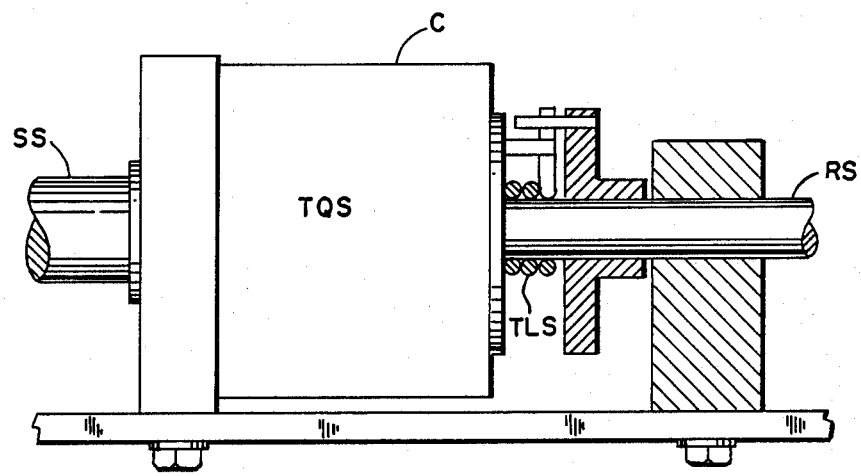
_Fig. 3_
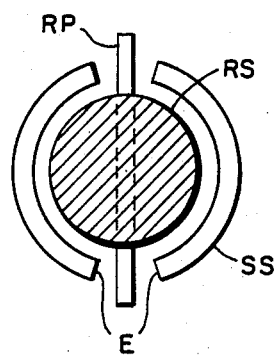
_Fig. 4_
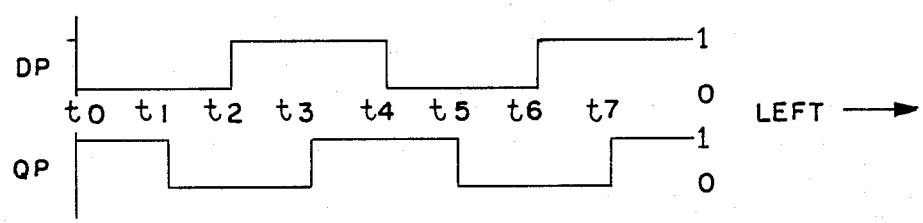
_Fig. 6_

4,860,844

POWER STEERING SYSTEM

BACKGROUND

The field of the invention is power steering apparatus for vehicles, especially those whose steered wheels are turned by one or more hydraulic actuators, and that are primarily for off-highway applications such as agriculture or earth moving. Many prior power steering systems for use in such vehicles have hydraulic equipment such as hoses and/or mechanical linkages entering into the cab of the vehicle. Some prior systems exhibit drift, requiring the driver to continue turning the steering wheel slowly in order to drive straight.

SUMMARY OF THE INVENTION

In the present invention only electrical cables are permitted to enter into the driver's cab; it could be called a "steer-by-wire" system. Among steer-by-wire systems, the following three approaches among others are possible: (a) open-loop control of steered wheel motion based upon the velocity of the steering wheel; (b) direct position control of the steered wheels from the steering wheel; and (c) torque demand control, wherein the torque at the steered wheels is a more powerful copy of the torque applied to the steering wheel by the the operator.

The present invention is primarily a torque demand control system of type (c) above; it has the advantage of feeling closest to the way present power steering systems feel to the driver. The invention includes also an open-loop secondary system of type (a) above, which comes into use if the primary torque demand system fails.

One object of the invention is to provide a vehicular power steering system responsive to torque demand and having no mechanical linkages between the portions of the system that are in the cab or control area of the vehicle and the portions outside the cab.

Another object is to require no hoses or other hydraulic components in the cab.

An object is to utilize a torsional spring and an electromechanical torque sensor for producing torque demand signals.

An object is to have less drift (precession) between the steering wheel (or other controlling device) and the steered wheels of the the vehicle.

An object is to have new synchronization occur upon startup, so that neither the steered wheels nor the steering wheel moves initially upon startup.

An object is to have no stops limiting the rotation of the steering wheel other than those that are imposed by reflection of the stops on the steered wheels.

An object is to for the torsional feel to the driver to be smooth and stable, and for reaction from the road wheels to be felt in the steering wheel.

An object is to provide both a primary steering system and a secondary steering system capable of controlling the vehicle from the same steering wheel, and means for automatically switching to the secondary system if a failure occurs in any of various electrical portions of the primary system.

BRIEF DESCRIPTION OF FIGURES

FIG. 1 is a simplified block diagram of the preferred embodiment of the invention.

FIG. 2 is a cross-sectional view of a portion of the system located in the cab of a vehicle.

FIG. 3 is a cross section of a torsional spring and torque sensor assembly that is a component of the invented apparatus.

FIG. 4 shows in more detail a rotation pin that is part of the preceding assembly figure.

FIG. 6 is a timing diagram showing direct and quadrature signals produced by an incremental position sensor.

DESCRIPTION OF A PREFERRED EMBODIMENT

Primary Steering System

Figure 5:
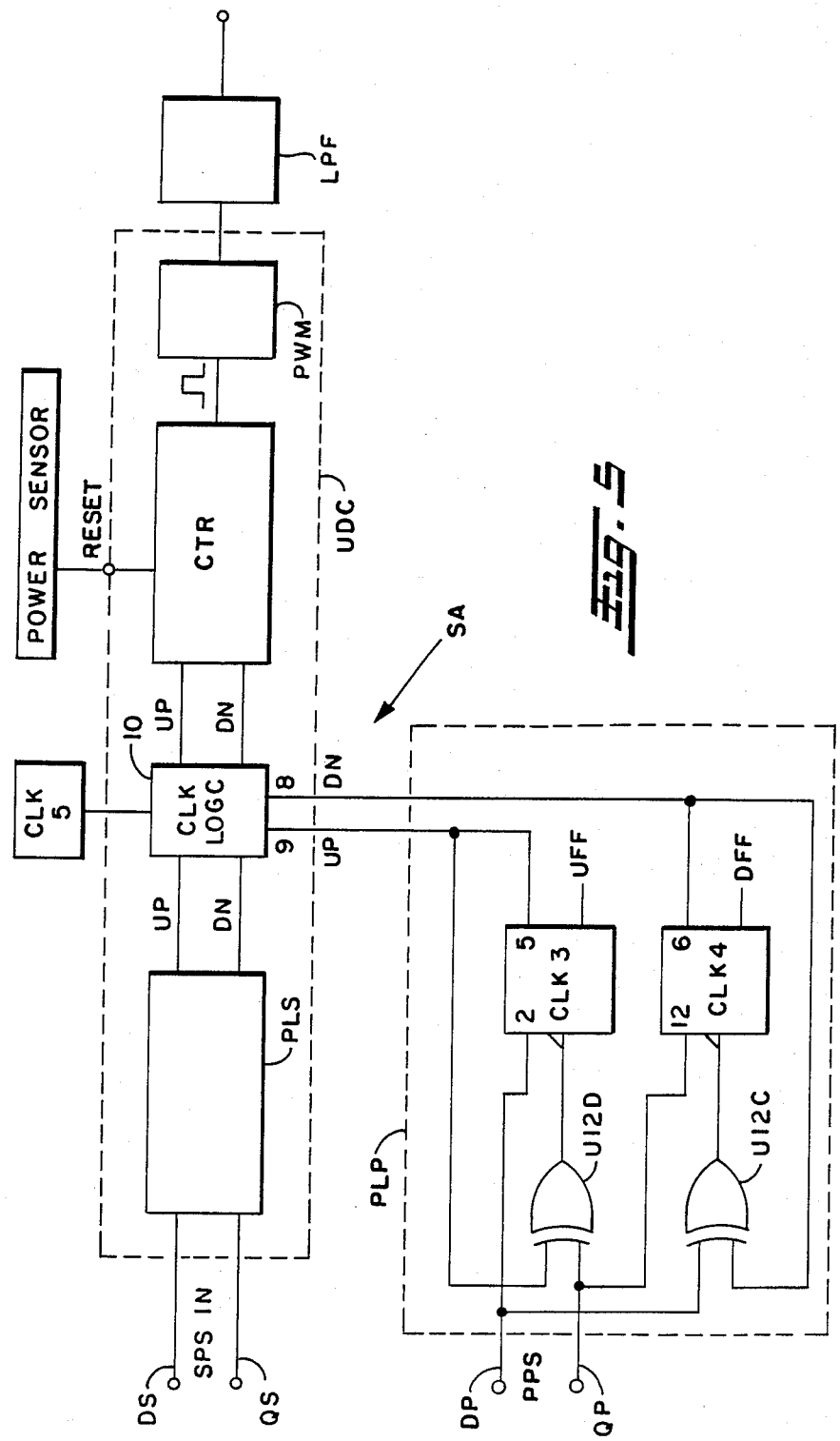
FIG. 5 illustrates a portion of an electronic module SA of the system.

The primary steering system, which is used under ordinary, no-fault conditions, has two main feedback control loops, i.e., an inner loop and an outer loop. Briefly, the inner loop forms a position controller in which the position of the steered wheels SDW is represented by the angular position of a motor shaft MS, which is located under the steering wheel SGW. The outer loop forms a torque demand steering controller. It uses a torque sensor TQS to control a multiplied torque for the steered wheels. These two feedback loops of the primary system overlap; the motor shaft MS, motor DCM and other components are used in common by both.

Inner Loop of the Primary System

The inner loop, an electrical servo, repeats the absolute position of the steered wheels SDW by angularly positioning the repeater shaft RS, which is connected to a torsional spring TLS in the cab.

The position sensors SPS and PPS and circuits for employing them are commercially available in the prior art. Electrical pulses are produced upon rotation of the sensor's rotor, a pulse being output each time the rotor turns through a small angle. The direction of rotation is determined by providing additional pulses in offset phase relationship, such as quadrature relationship, to the direct pulses. One direct pulse and one quadrature pulse constitute a set of pulses. The phase or timing of the quadrature pulses relative to the direct pulses indicates the direction. Sets of pulses from the sensor PPS representing a left turn increment the digital counter UDC, and sets of pulses from PPS in a right turn direction decrement it. On the other hand, left turn pulse sets from the sensor SPS decrement the counter UDC, and right turn pulse sets from SPS increment it.

The function of logic circuit PLP (FIG. 5) is to convert the two incremental input signals that it receives (i.e., direct signals at terminal DP and quadrature signals at terminal QP). Logic circuit PLP converts them into the pulse increment signals (at terminal 5, UP) and the pulse decrement signals (at terminal 6, DN) that are required by the up-down counter module (UDC). The logic circuit performs this function while ignoring spurious multiple counts even if the mechanical system dithers about a logic transition position of the position sensor.

The logic of circuit PLP is sequential as opposed to merely combinational. Timing diagrams of FIG. 6 show left turn signals output by the sensor PPS; they are converted by PLP to create an "increment" pulse train on the UP terminal 9 of UDC while maintaining unchanged the logic state signal on the DN terminal 8. This is true for an initial condition of either 1 or 0 on the UP terminal 9 or the DN terminal 8.

Mechanical dither that creates multiple signal transitions at only the direct (DP) terminal or only the quadrature (QP) terminal do not create state changes at the UP or DN count terminals 9, 8, because sequential transitions at both direct and quadrature terminals are required to cause a state change at an UP or DN terminal.

Referring to FIG. 5, the direct and quadrature signals from sensor PPS are input to terminals DP and QP respectively of the circuit PLP. Circuit PLP includes two D flip-flops called UFF and DFF, and two exclusive OR gates called U12D and U12C. Terminal DP is connected to a terminal 2 of UFF and to one input terminal of gate U12C. Terminal QP is connected to a terminal 12 of DFF and to one input terminal of gate U12D.

An output terminal 5 of UFF is connected to the other input of U12D. An output terminal 6 of DFF is connected to the other input of U12C. The output of U12D is connected to a clock terminal CK3 of UFF. The output of U12C is connected to a clock terminal CK4 of DFF. The output terminal 5 is also connected to an up-counting input terminal 9 of the up-down counter UDC. The output terminal 6 is also connected to a down-counting terminal 8 of UDC.

The operating characteristics of the well-known type of flip-flop used for UFF are as follows. When a signal at the clock terminal CK3 goes high (logic 1) the logic status of terminal 2 is sampled and replicated at terminal 5. The sampling of terminal 2 takes place at the leading edge of each new high signal on the clock terminal CK3. For example, if terminal 2 has a high when the clock goes high, 5 gets a high. Thereafter, 5 holds that high until at least the leading edge of the next new high on the clock terminal; at that time the data on 2 is again sampled and the new value, whether it be a high or a low (logic 0), is replicated at terminal 5. The flip-flop DFF operates in the same way.

The signals at terminals DP and QP of FIG. 5 are illustrated in FIG. 6. Leftward turning of the steered wheels produces pulse transitions in the following time sequence:

t0, direct goes low; t1, quadrature goes low; t2, direct goes high; t3, quadrature goes high; t4, direct goes low; t5, quadrature goes low; t6, direct goes high; t7, quadrature goes high.

Conversely, rightward turning results in:

direct going high; quadrature going low; direct going low; quadrature going high; direct going high; quadrature going low; direct going low; quadrature going high.

The logic states at various terminals are shown in Table 1, starting at a time shortly after t0 and before t1, and with an initial condition of logic zero at both terminal 5 and terminal 6. Rows of the table represent terminals (see FIG. 3); columns are time intervals (see FIG. 6); entries are logic states at the corresponding terminals and time intervals.

TABLE 1

|    | t0–t1 | t1–t2 | t2–t3 | t3–t4  | t4–t5 | t5–t6  | t6–t7 |
|----|-------|-------|-------|--------|-------|--------|-------|
| DP | lo    | lo    | hi    | hi     | lo    | lo     | hi    |
| QP | hi    | lo    | lo    | hi     | hi    | lo     | lo    |
| CK3| hi    | lo    | lo    | hi, lo | lo    | hi, lo | lo    |
| CK4| lo    | lo    | hi    | hi     | hi    | lo     | lo    |
| 5  | lo    | lo    | lo    | hi     | hi    | lo     | lo    |

TABLE 1-continued

|   | t0–t1 | t1–t2 | t2–t3 | t3–t4 | t4–t5 | t5–t6 | t6–t7 |
|---|-------|-------|-------|-------|-------|-------|-------|
| 6 | lo    | lo    | lo    | lo    | lo    | lo    | lo    |

Operation of the circuit of UFF can be understood by considering the input signals at terminals DP and QP, and the resulting signals at terminals 5 and CK3. FIG. 6 and Table 1 are helpful in following the description.

t0 - t1. In the time interval t0 - t1, the signal at terminal 5 is in an assumed initial condition of 0 (low). As shown in FIG. 6, terminal DP has a low signal and QP has a 1 (high) signal.

t1 - t2. At time t1, QP goes low. In this time interval, DP and terminal 5 are also low, as shown in the table above. The signal at clock terminal CK3 is controlled by the signals of terminals QP and 5 via the exclusive OR gate U12D. CK3 therefore goes low.

t2 - t3. At time t2, DP changes to a high. Because the CK3 signal is still low, no clock signal pulse is applied to UFF. 5 remains low during t2 - t3.

t3 - t4. At time t3, QP changes to high. The gate U12D provides a high to CK3, whereupon the high that standing on DP is clocked into UFF. UFF changes the terminal 5 signal to a high. With highs on both QP and 5, the CK3 signal is changed to a low a short time after t3; a short upward pulse has occurred on CK3. UFF maintains the high at terminal 5.

t4 - t5. At time t4, DP changes to low. CK3 remains low because both 5 and QP are high. In the absence of a new clock pulse, terminal 5 stays high.

t5 - t6. At time t5, QP changes to low. 5 is still high, so CK3 receives a high. This clocks into UFF the data at the DP terminal, which is low. The UFF produces a low at its terminal 5. With a low also at QP, CK3 goes low shortly after t5; a short upward pulse has occurred at CK3.

t6 - t7. At time t6, DP goes high. Both QP and 5 remain low, so no clock pulse occurs at CK3. Terminal 5 remains low.

During the time t3 - t7, terminal 5 has a high followed by a low, i.e., an up-going pulse. Terminal 5 is connected to input 9 of the controller chip UDC, so its pulse is counted by counter UDC. The count in UDC is incremented.

The output at terminal 6 remains low throughout the foregoing time sequence t0 - t7. Although an up-going edge occurs at CK4 at time t2, the data at terminal 12 (from QP) is then low, so terminal 6 remains low. At time t3, when terminal 12 has a high, CK4 was already high and remains high, and so does not experience an up-going clock edge. At t6, when CK4 again goes high, the data at terminal 12 is low, so terminal 6 stays low. Thus, a continuous low signal is presented to the DN terminal 8 of UDC during a left turn. No counts occur to decrement the contents of UDC.

During rightward turning, the counter is decremented in a manner similar to the incrementing described above. Because the increment and decrement logic are symmetrical, for right turns the signal states of UFF and DFF and of U12D and U12C are reversed from those described for left turns. Right turn signals from PPS create a pulse train on terminal 6 of DFF, which is connected to the DN terminal 8 of UDC, and maintain unchanged the logic state on terminal 5 of UFF. During a right turn, the next-occurring signal transition at terminal QP following an up-going edge of signal at terminal DP, is a down-going edge (instead of an up-going edge, as would be the case in a left turn). The quadrature signals occurring during a right turn are 180 degrees different from those occurring during a left turn, where the reference phase in both cases is the phase of the direct signals.

The dither immunity of the circuit can best be explained by example. The position sensor PPS (and SPS) in this embodiment includes a rotatable mechanical element that produces a pulse each time it rotates from one angular sector to the next (in response to steering). Pulses occur when the element rotationally traverses boundaries between contiguous angular sectors. If dither were to produce one or more extraneous spurious pulses (up and down) of, for example, the DP signal after t1 and before t2, the train of signals at the output terminals 5 and 6 would not be affected. This is true because both 5 and QP would be low, so CK3 would remain zero; in the absence of an up-going edge of a clock pulse at CK3, the UFF would not change the logic state of its output terminal 5.

Moreover, the DFF flip-flop would remain at zero output state because, although CK4 would receive a pulse when DP produces the spurious pulse with 6 being zero, the 12 terminal of DFF would then be having a low from QP. The clock pulse at CK4 would merely clock in a zero from the 12 terminal to the 6 terminal, so there would be no change in signal at 6.

A module PLS within the commercially available counting device UDC receives direct signals at a terminal DS and quadrature signals at a terminal QS from sensor SPS. The module PLS has circuitry to convert these direct and quadrature signals into increment (UP) pulse signals and decrement (DN) pulse signals that are supplied to the counter CTR via clock logic circuit 10 to make CTR count up and count down. If desired the logic circuit of PLP described above can be employed in PLS also, to reduce dither problems.

A 5 MZ clock oscillator CLK5 and a simple prior art clock logic circuit 10 are provided to feed pulses into the counter CTR from both of the sources of pulse sets, SPS and PPS.

The counter UDC is a digital device called a "Stepping Servo Controller" that is sold commercially as Model GL-1200 by Galil Motion Control, Inc., of Mountain View, Calif. It has a digital counter CTR capable of counting upward and downward in response to two sets of signals, e.g., a command set and a feedback set. It also includes a pulse width modulation circuit PWM for outputting periodic unipolar pulses whose pulse widths are modulated. These output pulses are lowpass filtered in a conventional filter LPF to enable them to serve as analog error signals.

The count in the counter CTR is reset to zero by a power sensor at a reset terminal of CTR upon interruption of power supply, so it has a count of zero upon starting of the vehicle. The count in CTR represents the difference, accumulated since the counter was reset to zero, between (a) the net change in position of the Pitman position sensor PPS and (b) the net change in position of the shaft position sensor SPS at the motor shaft MS in the cab.

If desired a velocity signal can also be provided. The preferred embodiment uses a sum of position feedback and adjustable velocity feedback (not shown) to control the current to the motor DCM.

The use of an incremental position sensor permits the steering wheel to synchronize automatically with the steered wheels at the positions existing when power is turned on, without corrective motion of either member. When the system is switched on with the steering wheel misaligned, the steering wheel's existing position is adopted as the "zero" or center position.

The incremental sensors also eliminate any drift between steered and steering wheels while the system is operating and permit high loop gain and high speed in the inner loop. The inner loop has a bandwidth of about 10 Hz, and is therefore dynamically faster than the outer loop described below.

As shown in FIG. 1, a motor shaft position sensor SPS, which is one of the incremental position type of sensors described above, is coupled to the motor shaft MS of a motor DCM so as to keep track of the rotational position of the shaft MS. When the shaft turns, the sensor SPS produces electrical pulses, which are conducted through a directional logic circuit to inputs of the counter CTR in UDC. Pulses indicating rotation in one direction go to a down-counting input terminal and those in the other direction to an up-counting input. Pulses representing the position of the steered wheels SDW are also received and counted at the inputs of the counter UDC.

The difference between the number of up counts and the number of down counts is the net count in UDC. It is output from the commercially available counter device as a pulse width modulated signal, which is converted to an analog error signal by a lowpass filter following the device UDC. The analog signal is amplified in a transistor motor drive circuit MD, whose output is connected through a fault-disconnect relay to the armature terminals of the motor DCM. Current from the motor drive MD moves the rotor of the motor DCM to correct the position of motor shaft MS so as to reduce the error signal to zero. The circuit MD includes a current feedback from a resistor that is in series with the armature of the motor DCM. Other feedback techniques could be used instead. The position of motor shaft MS is a copy of the position of the steered wheels.

Outer Loop of the Primary System

The outer loop comprises TQS, TDA, DRV, SV, HP, PMA, SDW, PPS, SA, MD, DCM, MS, G, RS, and TLS (FIG. 1). Analog signal processing in this signal path stabilizes the system. The outer loop's bandwidth and hence the speed of response are limited by heavy mechanical and hydraulic components rather than by the electronic circuits. Its bandwidth is typically about 3 Hz.

The steering wheel SGW is mounted on a rotatable steering shaft SS, which transmits the driver's steering torque to one end of a torsional spring TLS. The repeater shaft RS is integrally coupled to the other end of the torsional spring TLS. By resisting rotation through the torsional spring connection, the repeater shaft RS provides a reaction torque that is felt at the steering wheel SGW.

The reaction means comprises the motor DCM and the gear train G (or belt system, etc.) for holding the repeater shaft in a reference position, as well as the torsional spring TLS for resiliently opposing any motion of the steering wheel from a steady state position corresponding to that reference position. The magnitude and direction of the driver's applied torque are detected by the sensor TQS, which develops a corresponding electrical signal; it is an error signal and a steering command.

The steering command signal from TQS is amplified in a torque demand electronic amplifier TDA and in a servo valve driver DRV, and is applied to a hydraulic cylinder. The cylinder has a piston HP which moves in response to the command. The piston HP is linked for actuation of a Pitman arm PMA of the steering mechanism. Forces applied by the piston HP to the arm PMA turn the steered wheels SDW. The greater the torque with which the driver turns the steering wheel, the greater the magnified torque that causes the steered wheels to turn.

Mounted in connection with the Pitman arm PMA is a Pitman position sensor PPS. It is an incremental pulse sensor of the type described above, which produces an electronic pulse feedback signal. That feedback signal is conducted to the cab, where it is connected to a servo amplifier SA. Although a symbol that usually represents an analog servo amplifier is used to clarity in FIG. 1, a digital circuit is employed to perform its functions, as shown in FIG. 5. Signal from PPS go through a pulse logic network PL to count-input terminals of the digital counter UDC. Other inputs to the counter UDC are described above in relation to the inner loop. This segment of the outer loop overlaps a segment of the inner loop.

The net count in UDC is converted to an analog feedback signal as described before. The analog output signal, which depends upon the difference between positions of steered wheels SDW and the motor shaft MS, goes to the input of the transistor motor drive circuit MD. MD has an output of sufficient power to enable it to drive the DC motor DCM, to whose armature terminals it is connected. Motor DCM has a permanent magnet field, so it does not rely upon any externally supplied electrical power supply to produce its magnetic field. The device DCM is a permanent magnet dynamo, suitable for use as a motor or generator, and having a conventional rotatable shaft MS. The device DCM is referred to elsewhere herein as electric dynamo means.

The shaft MS of motor DCM drives a two-gear train G; the direction of rotation depends upon the sign of the motor's input current. In the embodiment being described a gear train is employed. Various other coupling means such as belts and pulleys could be used instead. The smaller gear of the pair of low-backlash gears G is mounted on the output shaft of the motor DCM. The larger gear is mounted for driving a shaft called the repeater shaft RS. Six to one is the speed step-down ratio and torque step-up ratio accomplished by the gear train or other coupling means G.

Functionally, the steady state rotational position of the repeater shaft RS represents the position of the steered wheels SDW. As the wheels SDW turn right and left the shaft RS is driven clockwise and counter-clockwise by proportional amounts. The servo has just enough torque to normally prevent the operator from overpowering it. Description of the outer loop, (torque demand loop), is completed by describing the connection of repeater shaft RS to one end of the torsional spring TLS. When the driver is not applying any torque to the steering wheel SGW, it assumes an angular position that copies the angular position of the repeater shaft RS, as will be shown and described in connection with FIGS. 2, 3 and 4 below. When the driver torques the steering wheel the torque sensor TQS produces an electrical output signal whose magnitude and sign depend upon the angle by which the new position of the steering wheel differs from the position of the repeater shaft RS.

The steering wheel's limits of rotational travel are established by "reflection" of the mechanical stops of the steered wheels SDW, because in steady state the position of the steered wheels is continuously copied by the position of the repeater shaft RS, and the position of the repeater shaft is a zero-torque reference for displacements of the steering wheel.

The mechanical arrangement of components in the cab is best seen in FIG. 2. All cab components except the steering wheel SGW are enclosed in an open frame, which is bolted to a stationary structural member of the cab. Electrical power and signal conductors connect from components in the frame F to a power source, etc. The steering shaft SS enters the torsional spring TLS from above and the repeater shaft RS enters TLS from below. In FIG. 2 the motor DCM is shown as being geared to the shaft RS through the two bevel gears G. The incremental position sensor SPS for the motor shaft MS is also depicted. An electronics module containing amplifiers etc. is fastened inside the open frame F.

The torsional spring TLS and torque sensor assembly TQS can be of any of several types, the choice not being critical to the present invention. One such device, intended for measuring torque in a shaft, is disclosed in U.S. Pat. No. 4,173,265 to Kremer. However, in the preferred embodiment being described, spring TLS and sensor TQS (in a case C) are a unitary device (FIG. 3), which is mounted to the open frame F. The preferred sensor is the subject of a U.S. continuation patent application Ser. No. 048,159, filed May 11, 1987 of Kelledes and O'Neil, issued as U.S. Pat. No. 4,805,463 on Feb. 21, 1989 entitled Torque Transducer. That application is made part of this application by reference.

In this embodiment the steering shaft SS and the repeater shaft RS enter the assembly from opposite sides. They are resiliently coupled together by the torsional spring TLS. When the driver torques the steering wheel, the steering shaft SS rotates, but the repeater shaft segment RS, which is restrained by the gears G and motor DCM, cannot rotate unless the motor DCM turns. The torsional spring TLS is twisted by an amount that depends upon the steering torque.

A vane that is affixed inside case C to the steering shaft SS turns along with shaft SS when the driver turns the steering wheel. The vane looks like a four-blade propeller or fan blade. A similar vane, which is affixed to the repeater shaft RS, does not turn yet, so between the vanes there is relative rotation that depends upon the amount of steering torque. There are two sets of vanes.

Two magnetically isolated induction coils, one for each vane set, are mounted in the case C. They are energized by externally supplied AC current so as to establish two separate electromagnetic fields. Each of the sectoral rotary vane sets is located within a respective electromagnetic field and is operable to shunt substantially all of its respective field. Upon relative rotation the vanes change the phase of the electrical signal of each coil relative to its reference excitation to produce a phase output signal that represents the steering torque applied by the driver. The two channels, which work differentially to reduce common mode drift, add their output signals. A corresponding voltage signal is electronically produced, which is amplified in the torque demand amplifier TDA and the valve driver amplifier DRV, and is transmitted to the hydraulic servo valve SV.

Within the case C, near the torsional spring TLS, the repeater shaft RS is fitted with a transverse pin called rotation pin RP, as shown in FIG. 4. When the steering torque reaches five pound-feet, the rotation pin RP has turned with respect to a tubular end segment of the steering shaft SS, and it encounters edges E of holes in the shaft SS, as shown in FIG. 4. Any additional steering torque on steering shaft SS is transmitted through the rotation pin RP directly to the repeater shaft RS.

Secondary Steering System

In the event of loss of electrical power, (and/or, if desired, of other electrical or electronic equipment failure), the primary steering system automatically defaults within a second to the secondary steering system. The secondary steering system is open loop. The vehicle's hydraulic system, including the servo valve SV, must still be functional in order for the the secondary steering system to operate, so the engine must be running. The repeater shaft RS is always coupled to the permanent magnet motor DCM. When the primary system fails the motor can act as a generator, as it requires no external excitation for its field. Rotation of the steering wheel clockwise or counterclockwise generates a positive or negative voltage in the machine DCM, of a magnitude that depends upon the rate of rotation of its shaft MS. The rate signal is communicated from the armature terminals to the servo valve SV.

The changeover from primary to secondary steering systems is accomplished by de-energization of a contactor CO, FIG. 1. When the electrical supply voltage (+ on FIG. 1) is low, the coil of contactor CO is de-energized. Thereupon contacts CO1 and CO2 of CO connect the terminals of the permanent magnet motor DCM with the servo valve SV. Contacts CO1 and CO2 also disconnect the motor drive amplifier MD from the armature terminals of motor DCM and disconnect servo drive amplifier DRV from servo valve V. If desired the circuit FL can lock itself out in the usual manner to prevent re-closing of CO if supply voltage reappears; after a fault condition has been corrected the circuit can be reset by means of a pushbutton switch.

The servo valve SV manages the hydraulic flow to the piston HP to control the steered wheels SDW during secondary system operation just as in primary system operation. Although in the preferred embodiment the motor DCM is a permanent magnet DC motor, other types of motors/generators that can generate voltage without external excitation can be used.

In secondary system operation, input torque that is higher than normal is required at the steering wheel, in order to "back drive" the motor DCM to serve as a generator. Also there is a dead band in the steering wheel action. These characteristics notwithstanding, in most circumstances the secondary steering system is expected to provide helpful control while the vehicle is brought to a stop and as a "limp home" feature.

I claim:
1. Power steering apparatus for a vehicle having a cab, a steering wheel and steered wheels comprising:
means communicating with said steered wheels for sensing their positions and for providing a first electrical signal related thereto;
mechanical position means (G) in the cab settable for representing the position of the steered wheels;
means (MS, DCM) receiving said first signal and responsive thereto for setting and holding said mechanical position means to represent the position of the steered wheels;
means for coupling a reaction torque from said mechanical position means to the steering wheel so as to oppose torque applied by a driver to the steering wheel;
torque sensing means (TQS, TLS) intermediate said mechanical position means and said steering wheel for sensing driver torque applied at the steering wheel and for producing an electrical demand signal in accordance therewith;
means receiving said demand signal and responsive thereto for applying to the steering wheels an amplified torque;
whereby no mechanical or hydraulic linkages must connect from the cab to other areas.

2. Power steering apparatus as in claim 1 and wherein said torque sensing means comprises:
spring means deflectable by torque applied by the driver; and,
deflection sensing means communicating with said spring means and responsive to deflection of said spring means for producing said demand signal in accordance with the deflection.

3. Power steering apparatus as in claim 1 and wherein said means for setting and holding the position of said mechanical position means comprises an electrical dynamo.

4. Power steering apparatus for a vehicle having a cab, a steering wheel and steered wheels comprising:
means (PMA, PPS) communicating with said steered wheels for sensing changes in positions of said steered wheels and for providing a first electrical signal related thereto;
mechanical position means (G) in the cab settable for representing the position of the steered wheels;
means (SPS) for sensing changes in the position of said mechanical position means and providing a second electrical signal related thereto;
means (SA, MD, DCM, MS) receiving said first signal and second signal and responsive thereto for setting and holding said mechanical position means to represent the position of the steered wheels, said means for setting and holding said mechanical position means comprising:
means (SA) receiving said first and second signals for determining the difference between the changes in position of the steered wheels and the mechanical position means, and for providing an error signal dependent thereupon; and,
means (MD, DCM, MS) receiving said error signal for moving said mechanical position means in a direction to reduce said error;
means (TLS, TQS) for coupling a reaction torque from said mechanical position means to the steering wheel so as to oppose torque applied by a driver to the steering wheel, said means for coupling comprising:
torque sensing means (TQS) intermediate said mechanical position means and said steering wheel for sensing driver torque applied at the steering wheel and for producing an electrical torque-demand signal in accordance therewith;
means (TDA, HP) receiving said demand signal and responsive to it for applying torque to the steering wheels;

whereby no mechanical or hydraulic linkages are required to be connected from the cab to other areas.

5. Power steering apparatus as in claim 4 and wherein:
said means for sensing the changes in positions of the steered wheels and for producing a first electrical signal comprises means for providing first electrical pulse signals indicative of changes of the steered wheels' position, and
said means for sensing the changes in position of said mechanical position means and providing a second electrical signal related thereto comprises means for sensing the position of said mechanical position means and producing second electrical pulse signals indicative of changes of that position; and,
said means for setting and holding comprises means for counting said first and second electrical pulse signals for providing an error signal in dependence upon the difference between the changes in positions of the steered wheels and the mechanical position means;
whereby the steered wheels' position does not drift with respect to the steering wheel's position during operation of the system.

6. Power steering apparatus as in claim 5 and wherein:
said means for providing first electrical pulse signals indicative of changes of the steered wheels' position comprises means for providing a first pair of real and quadrature timed pulse signals for enabling the direction of rotation of the steered wheels to be ascertained; and,
said means for sensing the position of said mechanical position means and producing second electrical pulse signals indicative of changes of that position comprises means for providing a second set of real and quadrature timed pulse signals for enabling the direction of rotation of said mechanical position means to be ascertained.

7. Power steering apparatus as in claim 5 and further comprising means for resetting said error signal means to a zero starting condition upon application of power, whereby neither the steered wheels nor the steering wheel moves initially upon startup.

8. Power steering apparatus as in claim 4 and wherein said means for setting and holding the mechanical position means comprises electric motor means responsive to said error signal and mechanically connected for setting and holding of said mechanically position means.

9. Power steering apparatus for a vehicle having a cab, a steering wheel and steered wheels comprising:
means communicating with said steered wheels for sensing position said steered wheels and for providing a first electrical signal related thereto;
mechanical position means in the cab settable for representing the position of the steered wheels;
means receiving said first signal and responsive to it for setting and holding said mechanical position means to represent the position of the steered wheels;
means for coupling a reaction torque from said mechanical position means to the steering wheel so as to oppose torque applied by a driver to the steering wheel;
torque sensing means intermediate said mechanical position means and said steering wheel for sensing driver torque applied at the steering wheel and for producing an electrical torque demand signal in accordance therewith;
means receiving said torque demand signal during normal steering operation and responsive to it for applying a torque to the steering wheels;
said means for setting and holding the position of said mechanical position means comprising an electrical dynamo having a shaft, said dynamo being unitary means usable as both (a) an electric motor for setting and holding said mechanical reference means during normal steering operation and (b) as an electric generator responsive to motion of said steering wheel for generating electrical power following failure of normal steering operation, for back-up steering operation;
said power steering apparatus further comprising means (CO) for connecting said dynamo (DCM) (a) to serve as said electric motor for setting and holding said dynamo shaft during normal steering operation and actuable upon sensing a failure of normal primary steering to reconnect said dynamo (b) to serve as said electric generator for generating electrical power in response to motion of said steering wheel during said backup steering operation, said shaft (MS) being mechanically turnable via the steering wheel thereupon, and said generated electrical power being connected to said means for applying torque to said steered wheels during backup steering operation.

10. Power steering apparatus as in claim 9 and wherein said dynamo means comprises permanent magnet motor/generator means.

* * * * *